W. M. AUSTIN.
FLUID PRESSURE REGULATING MECHANISM.
APPLICATION FILED MAR. 8, 1907.
1,103,020.
Patented July 14, 1914.
2 SHEETS—SHEET 1.
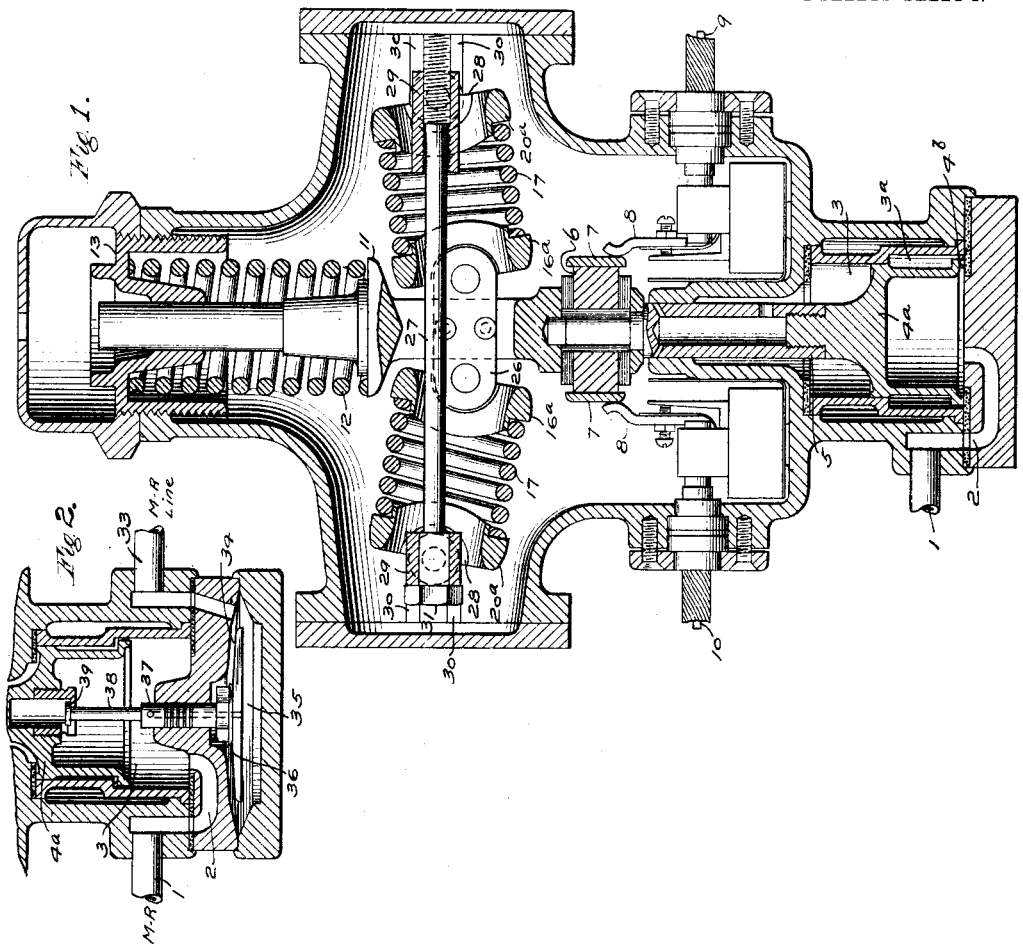
WITNESSES
INVENTOR
Walter M. Austin
by E. Wright
Att'y.

W. M. AUSTIN.
FLUID PRESSURE REGULATING MECHANISM.
APPLICATION FILED MAR. 8, 1907.
1,103,020.
Patented July 14, 1914.
2 SHEETS—SHEET 2.
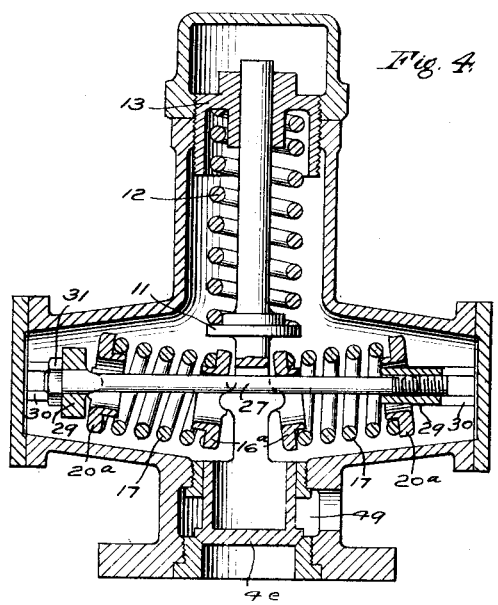
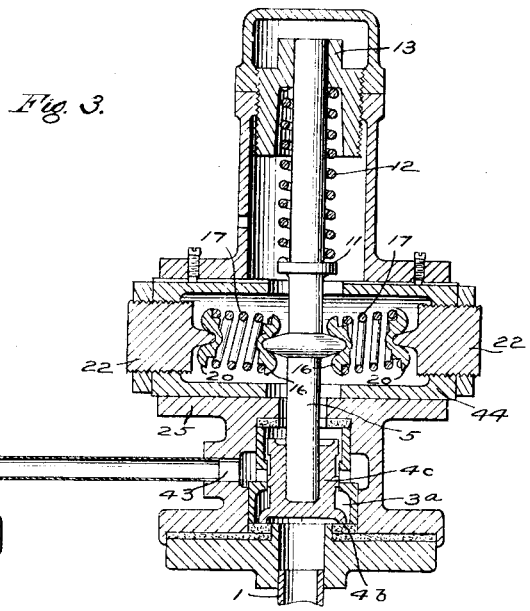
WITNESSES
INVENTOR
Walter M. Austin
by E. Wright
Att'y.

UNITED STATES PATENT OFFICE.

WALTER M. AUSTIN, OF SWISSVALE, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE-REGULATING MECHANISM.

1,103,020. Specification of Letters Patent. Patented July 14, 1914.

Application filed March 8, 1907. Serial No. 361,264.

*To all whom it may concern:*

Be it known that I, WALTER M. AUSTIN, a citizen of the United States, residing at Swissvale, in the county of Allegheny and State of Pennsylvania, have invented new and useful Improvements in Fluid-Pressure-Regulating Mechanism, of which the following is a specification.

This invention relates to fluid pressure mechanism, such as pump governors, safety valves, pressure reducing valves, and the like, wherein fluid pressure is regulated and maintained at a certain maximum degree, or between any two given points, such as the desired minimum and maximum degrees of pressure, either by governing the pump or compressor by which the fluid pressure is generated, or controlling the supply of fluid to or its release from the chamber or space in which the desired degree or range of pressure is to be maintained.

The principal object of this invention is to provide an improved compound spring mechanism for devices of this character, and so arranged that the combined effort of the springs acting in opposition to the fluid pressure may be made to vary in any desired manner during the movement of the device from one of its extreme positions to the other.

Broadly stated, my invention may be said to comprise a movable abutment, or piston, subject in one direction to the fluid pressure to be regulated or governed, a main resistance spring acting in opposition to the fluid pressure with a force which constantly increases as the spring is stressed during the movement of the abutment in one direction by the fluid pressure, and one or more auxiliary springs, the component force of which, acting in a direction opposite to that of the fluid pressure, constantly diminishes as the abutment moves outward under the action of the fluid pressure. The auxiliary springs are preferably arranged in the form of a toggle connection acting at a large angle against a movable part of the abutment, and by properly designing these springs with reference to their size, length, and angle of operation, the component of the force of the auxiliary springs may be made to diminish more rapidly than the force of the main spring increases during the outward movement of the abutment, so that the combined spring effort shall be a maximum when the abutment is at its extreme inside position and shall gradually diminish as the abutment moves outward under fluid pressure to its other or extreme outer position; or by a suitable adjustment of the auxiliary springs their component force may be made to just offset or balance the variation in the force exerted by main spring as it changes position, whereby the combined spring effort acting on the abutment may be made substantially constant throughout its range of movement. It will also be apparent that further adjustment of the auxiliary springs will provide other variations in the combined spring action.

The form of my improvement wherein the combined spring effort acting in opposition to the fluid pressure is maximum at one extreme position of the abutment, and diminishes throughout the movement to the other, or outer position, at which it is a minimum, is particularly adapted to be applied in pump governors, safety valves, and the like, wherein a positive and rapid movement of the abutment, or valve, from one position to the other is desirable. In the application of my invention to this class of devices, the auxiliary spring mechanism is preferably arranged to exert a continually decreasing resistance to the fluid pressure during the outward movement of the abutment, and after a partial movement in this direction to assist the movement of the abutment during the latter part of the stroke, so that at the cut-out position the combined spring force acting in opposition to the fluid pressure is at a minimum. Then as the fluid pressure diminishes to such a point that the minimum spring force starts the abutment in the opposite direction, the component of the auxiliary spring opposing the main spring continually decreases and after a partial movement assists the action of the main spring during the latter part of the inward stroke, thereby effecting a quick opening and closing action of the governor.

Another feature of my invention comprises an improved construction of movable abutment, or piston, whereby a tight joint is maintained in each of the opposite positions, while the same effective area of abutment is exposed to the fluid pressure at all times.

Still another feature of my invention comprises an improved differential pressure mechanism, which may be attached to the governor device for operating the same according to two different fluid pressures, and thereby effect a simultaneous action of a plurality of governors.

In the accompanying drawings: Figure 1 is a vertical section of an electric pump governor embodying my invention; Fig. 2 a broken sectional view of the piston chamber of the governor shown in Fig. 1, with my improved differential pressure attachment applied thereto; Fig. 3 a sectional view of another modified form of governor device, in which an additional actuating piston is employed for throwing the main controlling means, or switch; and Fig. 4 a vertical section showing the invention applied to a safety valve.

Referring to Sheet 1 of the drawings; my improvements are shown as applied to electric pump governors, wherein the main controlling device comprises a movable switch member for opening and closing an electric circuit which furnishes current for the motor operating a pump according to the fluid pressure produced by the pump, but it is evident that these improvements might also be applied in connection with pumps or compressors operated by other forms of motors.

In Fig. 1 of the drawings, the pipe 1 is connected to the reservoir, or vessel, in which the desired pressure is to be maintained, and through this pipe and the passage 2, the chamber 3, below the piston 4ª, is in open communication with the reservoir or space within which pressure is to be maintained between certain limits. The piston is connected to a stem 5 carrying a disk or cross piece 6, which is insulated from the stem and provided on its opposite sides with contact plates 7 adapted to make and break contact with the fingers or contact pieces 8, and thereby close or open the circuit through the wires 9 and 10, through which current is supplied to the motor of the compressor.

The extension of the stem 5, which may be integral with or an additional piece to the stem 5, is provided with a shoulder 11, which forms an abutment for one end of the main spring 12. The main spring surrounds the upper portion of the stem, and at its outer end abuts against the adjustable screw plug 13.

The inner abutments 16ª have cylindrical bearings on projections secured to transverse bars 26 secured to the stem on opposite sides of the adjusting rod 27, and the outer abutments 20ª have similar cylindrical bearings on projections or trunnions 8, on opposite sides of the sleeve 29, the outer extremities of the trunnions being fitted between the guides 30. The adjusting rod 27 is screw-threaded at one end in one of the sleeves 29, and at the outer end is provided with a head 31, which bears against the outer end of the other sleeve 29, and is so shaped that it may be turned so as to turn the screw-threaded end of the rod in the other sleeve and thereby adjust the pressure of the springs.

As shown in the drawing, the circuit is closed and the auxiliary springs 17 are inclined from their outer to their inner ends in the direction of the piston end of the stem 5, so that the springs 17 assist the main spring 12 in holding the circuit closed, in opposition to the fluid pressure acting on the outer side of the piston 4. When the fluid pressure acting on the outer side of the piston 4 exceeds the maximum degree of fluid pressure desired, and for which the springs are adjusted, say 90 pounds, the piston will move inward compressing the main spring and the auxiliary springs until the axes of the auxiliary springs are in line and this portion of the movement will be made under a continually diminishing resistance by the auxiliary springs, and the further movement will be assisted by the auxiliary springs with increasing force as they incline in the opposite direction to the end of the stroke. The movement by which the circuit is broken will, therefore, increase in rapidity from the beginning to the end of the stroke. When the circuit is broken and the compressor motor stops, the circuit will remain open until the pressure in the reservoir and on the outer side of the piston falls to the desired minimum, say 80 pounds. The main spring, being adjusted to overcome the sum of this reduced pressure and the pressure of the auxiliary springs acting in opposition to it, will move the piston and stem in the direction for closing the circuit, and this movement will meet with a continually diminishing resistance until the axes of the auxiliary springs are in line, and beyond that position the auxiliary springs will assist the main spring with increasing force to the end of the stroke which closes the circuit, so that the rapidity of the movement increases from the beginning to the end of the stroke.

It will be seen that in my improved governor the resistance to the opening and closing movements of the switch continually decreases from beginning to end and that the rapidity of movement accordingly increases from beginning to end; and the resisting pressure of the auxiliary springs decreases from a maximum positive quantity at the beginning of the stroke to zero at a certain position, and beyond that position to a negative or assisting pressure by which the speed of the opening and closing movements is accelerated.

My improvement is not limited to the employment of two auxiliary springs, as any greater number may be employed; and it is obvious that the principle of operation will be the same if one of the two springs shown be omitted.

The main resistance spring is of suitable length, and the auxiliary springs are adjusted at a proper angle and strength, so that the combined force or effect of all the springs acting in opposition to the fluid pressure varies in substantially a constant ratio from a maximum quantity at the normal inner position of the abutment to a minimum amount at the normal outer or cut-out position of the governor, and the resultant curve representing these forces throughout this range of movement will be substantially a straight line. The springs act positively, and at all times, upon the movable abutment subject to the fluid pressure, and the range of the governor may be varied, as desired, by changing the adjustment of the springs.

According to another feature of my improvement, the piston or abutment may be formed as shown in Fig. 1, wherein the piston $4^a$ is provided with a lower cylindrical extension having a flange $4^b$ operating in an enlargement $3^a$ of the cylinder 3, whereby the area of the piston exposed to the fluid pressure is the same at all times, and the piston makes a tight seat against the gasket at each end of its stroke. This prevents leakage around the piston in either of its opposite positions and the area acted upon by the fluid pressure is the same in both positions.

In Fig. 2 I have illustrated another feature of my improvement, in which, for the lower head of the piston chamber, I substitute a casing having two chambers 35 and 34 on opposite sides of the diaphragm 36, which operates a stem 38 having a head 39, adapted to slide in a slot or recess in the piston $4^a$ and to exert a pull upon said piston when the same is in its outer position and the pressure upon the upper side of diaphragm 36 in chamber 34 exceeds that in chamber 35 on the other side of the diaphragm.

The chamber 35 communicates through port 37 in the stem with the piston chamber and consequently contains fluid at the reservoir pressure, while the chamber 34 communicates through pipe 33 with some other fluid pressure, such as a main reservoir pipe line connecting a plurality of reservoirs, which are supplied with pressure by a plurality of pumps, usually one for each reservoir. In such a case, if one pump starts working in advance of another, the corresponding increase in pressure in the main reservoir line creates a differential pressure acting on the diaphragm, which is sufficient, when combined with the spring pressure, to overcome the reservoir pressure acting on the piston and cause the same to move inward and close the switch, thereby supplying current to the motor and starting the pump. By means of this feature of my improvement all the governors of the several pumps may be made to operate substantially simultaneously in actuating the controlling devices to cause the pumps to cut in and start working.

According to the modification shown in Fig. 3, the movable abutment which is subject to the reservoir pressure and the spring mechanism, is made in the form of a valve $4^c$, which controls the port or passage 43 and the supply of fluid under pressure to, and its release from the cylinder 40 containing the actuating piston 41, which operates the main controlling device, or switch member, 6, and is normally returned to its inner or release position by means of the spring 42. The governing spring mechanism, as shown in this modification, corresponds substantially with that of Fig. 1, except that the adjusting screws 22 for the auxiliary springs 17, as well as the springs themselves, are mounted within a tube or hollow casing 44, which is slidingly mounted in the casing 25 of the governor, and the adjusting screws have conical projections bearing within corresponding recesses in the spring caps 20. The operation of this form of my improvement will now be readily understood. When the fluid pressure from the pump, or reservoir, acting upon the face of the abutment $4^c$, rises sufficiently to overcome the combined effort of the spring adjustment in this position, the abutment moves rapidly to its upper seat, as before described, at the same time opening communication from the fluid supply 1, around the valve head to port 43 and into cylinder 40, where it acts upon piston 41 and throws the same outward against the spring 42 to its seat 50, thereby moving the switch member quickly to open the circuit and cut out the pump. The parts then remain in this position until the reservoir pressure diminishes to the desired minimum or cutting in point of the governor, as determined by the combined spring action, whereupon the valve piston $4^c$ is moved rapidly to its lower seat, thus opening communication from the port 43 to the atmosphere, so that the pressure exhausts from cylinder 40 and the spring 42 acts to throw the piston 41 and switch member 6 rapidly to the inner or closed position, thereby cutting the pump into operation.

According to the modification illustrated in Fig. 4, my improvement is shown as applied to a safety valve device, in which the abutment or valve $4^c$ is subject to the fluid pressure to be relieved, while the spring mechanism acting on said valve in opposition to the fluid pressure, is of substantially the same construction as previously described in connection with Fig. 1. When the pressure in the reservoir, or boiler, acting on the valve 4ᵉ, overcomes the force for which the springs are adjusted, the valve moves upward, opening the outlet port 49, through which the fluid is discharged. This outlet port is of a smaller capacity than that on which the valve 4ᵉ seats, so that the pressure still acts upon the valve in opposition to the spring pressure when the outlet port is open. Then as the pressure diminishes to a predetermined point, the springs operate to seat the piston, or valve, 4ᵉ in the same manner as previously described.

Having now described my invention, what I claim as new and desire to secure by Letters Patent, is:—

1. In a fluid pressure mechanism, the combination with a controlling device, of a piston for operating said device and having a surface exposed to fluid pressure when off its seat which is equal in area to the area exposed to fluid pressure in seated position, and means for seating said pistons at opposite ends of its stroke.

2. In a fluid pressure mechanism, the combination with a controlling device, and a piston for operating the same, of a seat for said piston at each end of its stroke, and a flange on said piston which forms a surface of the same area exposed to fluid pressure when the piston is unseated as is exposed when the piston is seated.

3. In a fluid pressure mechanism, the combination with a controlling device, and a piston for operating the same, of a diaphragm subject to differential fluid pressures and having lost motion connection with said piston.

In testimony whereof I have hereunto set my hand.

WALTER M. AUSTIN.

Witnesses:
R. F. EMERY,
J. B. MACDONALD.